Jan. 12, 1943.  C. P. DEIBEL  2,307,767
DRY CELL BATTERY UNIT
Filed Oct. 1, 1941
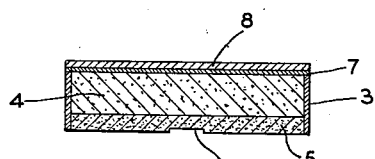
FIG.1.
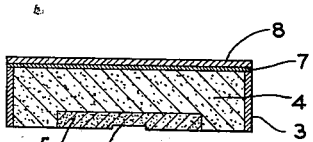
FIG.4
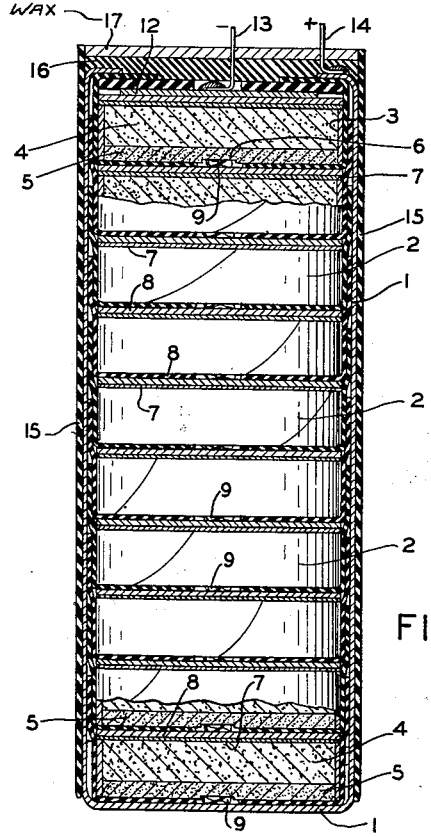
FIG.3.
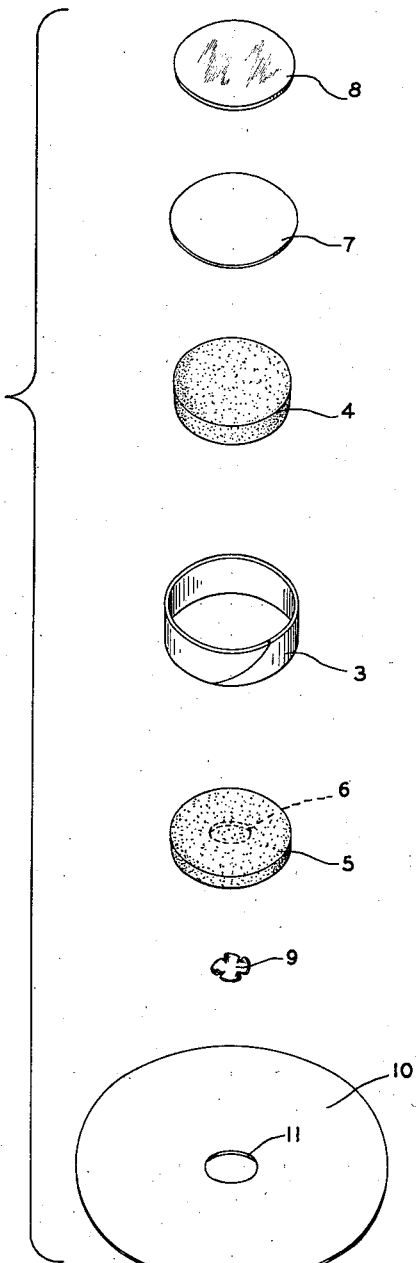
FIG.2.
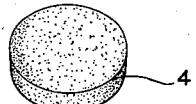
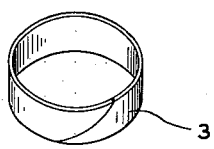
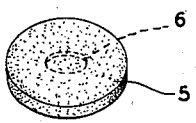
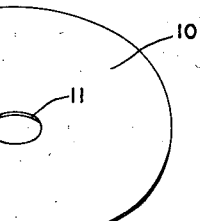
INVENTOR.
CYRIL P. DEIBEL.
BY Fay, Macklin, Gohrick,
Williams, Chilton and Isler.
ATTORNEYS Patented Jan. 12, 1943

2,307,767

UNITED STATES PATENT OFFICE 2,307,767

DRY CELL BATTERY UNIT

Cyril P. Deibel, Lakewood, Ohio

Application October 1, 1941, Serial No. 413,143

7 Claims. (Cl. 136—111)

This invention relates to a dry cell battery unit which is made up of a plurality of thin, wafer-like dry cells which are sealed within an outer casing in such a manner that the likelihood of leakage is reduced to a minimum, and which is particularly well adapted for use with hearing aids, portable radios and the like where space is at a premium and where a leak-proof battery is desirable.

One of the objects of the invention is to provide a dry cell battery unit of the character described which occupies little space for a given energy output and which is particularly well adapted for quantity production on automatic or semi-automatic machines.

Another object of the invention is to provide a dry cell battery unit having means for providing good electrical contact between the electrodes of adjacent cells, each cell being held in intimate contact with an adjacent cell and being enclosed within a layer of insulating material, the several cells being individually sealed in liquid-tight relation with respect to each other.

A further object of the invention is to provide a dry cell battery unit having the above described distinguishing features and characteristics and which has a high capacity and in which the number of soldered connections is reduced to a minimum and which will give a maximum of service hours and have a long shelf-life as well as an active life.

A still further object of the invention is to provide a dry cell battery unit which may be made in any desired size or shape and which may consist of any desired number of cells to give the desired voltage and capacity.

A still further object of the invention is to provide a dry cell battery unit which comprises essentially an outer casing containing a plurality of wafer-like dry cells arranged therein in stacked relation and connected in series, each cell comprising a retaining ring formed of suitable material, such as fish paper, and which contains a mass of mix and a carbon electrode preferably in the form of a relatively thin disk having a recess therein. Disposed over the retaining ring is a separator in the form of a paper disk and disposed over the paper disk is the zinc electrode, each cell being encased within a thin layer of insulating material such as "Pliofilm" which has sealed engagement with the next adjacent cell, and means holding all of such cells within said outer casing in intimate electrical contact.

Further and more limited objects of the invention will appear as the description proceeds and by reference to the accompanying drawing in which Fig. 1 is a vertical sectional view of one of the individual cells before it is encased in a Pliofilm layer; Fig. 2 is a disassembled view of the several parts which make up each cell; Fig. 3 is a vertical sectional view of the completed battery unit; and Fig. 4 is a vertical sectional view of a slightly modified form of cell.

Referring now to the drawing, the reference character 1 designates an outer container or casing preferably formed of metal and which contains a plurality of thin wafer-like dry cells indicated generally by the reference character 2. Each cell comprises a supporting member 3 which receives therein a mass of depolarizing mix 4 having a carbon electrode 5 embedded therein. Each carbon electrode has a centrally disposed recess 6 in the bottom thereof, the purpose of which will hereinafter appear.

The mass of mix may be pre-formed or, if desired, may be compressed within the retaining ring around the carbon electrode. Disposed over the mass of mix is a paper separator 7 which is preferably coated on both sides with battery paste. Disposed over and co-extensive with the paper disk 7 is a zinc disk or electrode 8. Positioned within each of the recesses 6 is a spring-like electrical conductor 9 preferably formed of phosphor bronze. Each cell is encased within a layer of insulating material 10 such as "Pliofilm" or the like and which preferably has liquid-tight sealed engagement with the next adjacent cell. Each Pliofilm layer is preferably in the form of a disk and has a central opening 11 therein.

When the cells are assembled, the Pliofilm disk is coated with a thin layer of oil or other suitable material so that it adheres to the next adjacent Pliofilm layer. A plurality of cells are arranged within the outer metal container in stacked relation, as shown in Fig. 3, the spring-like conductor 9 serving to provide good electrical contact between each carbon electrode and the next adjacent zinc electrode. The spring-like conductor 9 of the lowermost cell of course has contact with the bottom of the metal casing. Disposed over the uppermost cell is a terneplate disk 12 to which is soldered a negative terminal 13. Leading from the outer metal casing and soldered thereto is a positive terminal 14. The metal casing is enclosed within an insulating jacket 15 and closing the upper end of the battery unit is an asphalt seal 16 which receives thereover a wax seal 17. The individual cells are inserted within the outer container in any suitable manner. One form of apparatus for assemblying the battery unit is disclosed in my copending application Serial No. 407,015, filed August 15, 1941.

It will be noted that the size of each Pliofilm disk is such that when it is folded upwardly about the next adjacent cell, it extends to a point near the top of the next adjacent cell. In other words, the Pliofilm disk overlaps each adjacent cell for a substantial distance and is sealed thereto by a thin layer of oil or other suitable sealing material. The layers of Pliofilm have a thickness of approximately 2/1000 of an inch and therefore occupy very little space, thus permitting a maximum quantity of active materials to be used. Pliofilm is hydrochlorinated rubber, that is, rubber to which hydrogen chloride has been added. Pliofilm is strong, somewhat stretchable, tear resistant impervious to moisture and gas and resistant to oil and hydrocarbons and has the quality of being sealed by fusion when heat is applied thereto.

While I prefer to use Pliofilm, it is of course to be understood that I may use any thin insulating material having the desired qualities and characteristics. It will be noted that each cell is separately and individually encased within a layer of sealing material and that each layer of insulating material has liquid-tight sealed engagement with the next adjacent layer of insulating material of the next adjacent cell.

In assembling the cells, the metal casing 1 with the cells arranged therein as shown, is placed within a suitable fixture and the cells placed under considerable compression. With the cells held in this condition, the upper edge of the metal casing is deflected or spun over inwardly to hold the cells in place in intimate electrical contact with each other. Any excess Pliofilm which may project from the top of the battery unit may be trimmed off, although that operation may be performed before the upper edge of the casing is turned over. The two seals at the upper end of the battery unit serve to effectively close the same.

In Fig. 4 there is disclosed a slightly modified form of cell which is identical with the cell disclosed in Fig. 1 except that the carbon electrode is considerably smaller and does not completely close the bottom of the retaining ring.

It is of course to be understood that the outer metal casing may be of any desired shape or size so as to receive the desired number of cells therein. The particular size and shape of the individual cells may also be varied as the exigencies of the occasion may demand. Various other changes may be made in the shape, size and arrangement of parts as well as in the materials used without departing from the spirit of my invention.

A dry cell of similar construction to the one herein disclosed forms the subject matter of my copending application Serial No. 407,015, filed August 15, 1941.

It will now be clear that I have provided a dry cell battery unit which will accomplish the objects of the invention as hereinbefore stated. It is to be understood that the embodiment of the invention herein disclosed is to be considered merely as illustrative and not in a limiting sense as the invention is limited only in accordance with the scope of the appended claims.

Having thus described my invention, what I claim is:

1. A dry cell battery unit comprising an outer casing, a plurality of dry cells arranged within said casing and held in intimate electrical contact with each other under pressure, each cell comprising a carbon disk, a mass of depolarizing mix, a separator disposed over said mass of mix, and a zinc electrode disposed over said separator, each cell being encased within a thin layer of insulating material having sealed engagement with the next adjacent cell, means disposed between each carbon disk and the next adjacent zinc electrode for providing good electrical contact therebetween, and means holding all of said cells within said outer casing in intimate contact with each other.

2. A dry cell battery unit comprising an outer casing, a plurality of dry cells arranged within said casing and held in intimate electrical contact with each other under pressure, each cell comprising a carbon disk, a mass of depolarizing mix, a separator disposed over said mass of mix and a zinc electrode disposed over said separator, each carbon disk having a recess in the bottom thereof which receives a spring-like electrical conductor for forming good electrical contact with the next adjacent zinc electrode, each cell being encased within a thin layer of insulating material having sealed engagement with the next adjacent cell, and means holding all of said cells within said outer casing in intimate contact with each other under pressure.

3. A dry cell battery unit comprising an outer casing, a plurality of dry cells arranged within said casing and held in intimate electrical contact with each other under pressure, each cell comprising a retaining ring which receives therein a mass of mix and a carbon electrode, a separator disposed over said retaining ring and closing the same, a zinc electrode disposed over said separator, a spring-like electrical conductor providing good electrical contact between each carbon electrode and the next adjacent zinc electrode, each cell being encased within a thin layer of Pliofilm having sealed engagement with the next adjacent cell, and means holding all of said cells within said outer casing in intimate contact with each other under pressure.

4. A dry cell battery unit comprising an outer casing, a plurality of dry cells arranged within said and held in intimate electrical contact with each other under pressure, each cell comprising a retaining ring receiving therein a mass of mix and a carbon electrode, a separator disposed over said retaining ring and closing the same, a zinc electrode disposed over said separator, a spring-like electrical conductor providing good electrical contact between each carbon electrode and the next adjacent zinc electrode, each cell being encased within a thin layer of Pliofilm having sealed engagement with the next adjacent cell, said outer casing having a portion thereover directed inwardly and holding said cells in intimate contact with each other under pressure.

5. A dry cell battery unit comprising an outer metal casing, a plurality of thin wafer-like dry cells arranged within said casing and held in intimate contact with each other under pressure, each cell comprising a retaining ring containing a mass of mix and a carbon disk having a recess in the underside thereof, a paper separator extending over said mass of mix and closing said retaining ring, a zinc electrode disposed over said separator and being substantially co-extensive therewith, a spring-like electrical conductor arranged within the recess in each carbon disk and having intimate electrical contact with the next adjacent zinc electrode, each cell being encased within a thin layer of Pliofilm or the like having sealed engagement with the Pliofilm layer of the next adjacent cell, and means holding all of said cells within said metal casing under pressure.

6. A dry cell battery unit comprising an outer casing, a plurality of dry cells arranged within said casing and held in electrical contact with each other under pressure, each cell comprising a zinc electrode and a mass of mix having a carbon electrode embedded therein, a spring-like electrical conductor carried by each carbon electrode and engaging each adjacent zinc electrode, a thin insulating cup receiving said zinc electrode and mass of mix and carbon electrode therein, the carbon electrode of each cell being secured in liquid-tight sealed engagement with the next adjacent insulating cup, each mass of mix being enclosed within an annular supporting ring.

7. A dry cell battery unit comprising an outer casing in which is arranged a plurality of wafer-like dry cells in stacked relation, each cell comprising a negative electrode, a mass of mix containing a positive electrode embedded therein, each cell being encased in a thin layer of insulatng material having liquid-tight sealed engagement with the next adjacent positive electrode, a spring-like conductor disposed between the positive electrode of each cell and the next adjacent negative electrode and forming good eletcrical contact therebetween, means holding all of said cells within said outer casing under pressure and in intimate contact with each other, each mass of mix being enclosed within a reinforcing member which serves to prevent dehydration thereof.

CYRIL P. DEIBEL.

CERTIFICATE OF CORRECTION.

Patent No. 2,307,767.   January 12, 1943.

CYRIL P. DEIBEL.

It is hereby certified that error appears in the printed specification of the above numbered patent requiring correction as follows: Page 2, second column, line 50, claim 4, after the word "said" insert --casing--; and that the said Letters Patent should be read with this correction therein that the same may conform to the record of the case in the Patent Office.

Signed and sealed this 16th day of November, A. D. 1943.

(Seal)

Henry Van Arsdale,
Acting Commissioner of Patents.